Sept. 22, 1936.  L. ROBBIN  2,055,223

INSULATED WIRE

Filed Oct. 8, 1932

Rubber oil-resin, finely divided oxide,--boron compound rubber oil resin
4-Textile winding
3-Coating as in Fig.1.

Textile winding-4
Coating as 5-in Fig.1.

INVENTOR

Patented Sept. 22, 1936

2,055,223

UNITED STATES PATENT OFFICE 2,055,223

INSULATED WIRE

Leon Robbin, New Rochelle, N. Y., assignor to Vega Manufacturing Corporation, Wilmington, Del., a corporation of Delaware Application October 8, 1932, Serial No. 636,844

8 Claims. (Cl. 173—264)

This invention relates to insulated wire and to an insulating compound therefor.

An object of the invention is to produce an insulated wire having a high dielectric strength.

Another object is to produce an insulated wire having an insulation which is resistant to moisture, salt air, humid atmosphere, acids and alkalis.

A further object is to produce a wire having a flexible heat resistant insulation and a high space factor.

Another object is to provide a rubber insulated magnet wire.

Other objects will be apparent from the disclosure in the drawing, of which:

Figure 1:
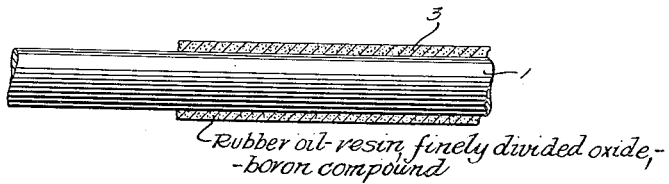
Fig. 1 shows one form of the invention.

I have found that if ordinary rubber is dissolved in a heat treated oil, such as a vegetable or fish oil, a new and improved rubber varnish or enamel is obtained. Preferably this is accomplished with the use of a vegetable oil which has already been heat reacted to its resinous point so that it is in the form of a fluid oil resin. Among the oils suitable for this purpose are, soya bean oil, cashew oil, China-wood oil, etc. I may also use an animal oil such as menhaden, sardine or one of the other fish oils. The amount of rubber added is dependent upon the use to which the varnish is to be put—I have used rubber in various amounts from 5% to 100% of the amount of oil. The process of making this varnish is comparatively simple, the rubber in solid form, such as smoked rubber being deposited in the reacted oil, the whole being heated up to the point where the rubber dissolves and combines with the oil into a fairly clear solution. When necessary to thin out it is advisable to use one of the usual varnish thinners of the naptha, xylol or toluol type. In such form the varnish may be applied to wire in the regular manner, that is, by continuous process.

If a refractory insulation is desired this may be produced in a manner similar to that described by Samuel Ruben in his copending applications, Serial Nos. 580,531 of 12th December, 1931; 619,019 of 9th July, 1932 and 631,654 of 3rd September, 1932; and in Letters Patent Nos. 1,896,041, 1,896,042, and 1,896,043 dated January 31st, 1933; in which is described an insulating compound for electrical conductors, comprising a finely divided inorganic refractory material, such as an oxide and a water-insoluble resinous binder, such as an oleoresinous varnish. Where high heat resistance was a factor, the compound contained an inorganic binder, such as boric acid or other boron compounds, effective at elevated temperatures. The rubber varnish described herein would be substituted for the organic binder.

The refractory compound of my invention would include then, a finely divided insulating compound which may consist of one or more of the oxides of such elements, as iron, chromium, titanium, beryllium, magnesium, aluminum, silicon, tantalum, vanadium, manganese, cobalt, nickel, copper, zinc, molybdenum, tungsten, lead, thorium, zirconium. Where the borates, silicates, hydroxides or hydrates of these elements form insulating compounds, these may be used. Mixtures containing more than one compound, for example beryl, chromite, rutile or mica, may also be used in combination or otherwise.

Finely divided aluminum may in some cases be substituted for one of the refractory materials, as aluminum, in a finely divided state is not conductive, probably due to the thin film of oxide which seems to naturally form upon its surface. If desirable, the thickness of this insulating film can be materially increased by chemical treatment, as for instance, by immersion in nitric acid.

In a number of cases it will be found desirable to add to the mixture of refractory material and organic binder, an inorganic binding and reacting agent. The choice of this is governed to some degree by the temperature which the insulating compound will be called upon to withstand, one of the objects in using a compound of this nature being to provide a binding action after the organic materials have lost their ability to hold the refractory material in place. Another reason is that these compounds usually increase heat and fire resistance of the organic materials with which they are mixed or come in contact with or impregnate and tend to preserve them from deterioration. It is well known that organic insulations definitely deteriorate with age and in time become conductive, due to carbonization. This effect is rapidly accelerated by heat, such as would be inherent in motors, etc., (see article by Steinmetz and Lamme, volume 32, pages 79 to 89, Journal of A. I. E. E.). The presence of the inorganic binding material, will definitely increase the life of the organic materials, by preventing early carbonization. The most satisfactory materials for this use are the boron compounds such as boric acid, sodium borate, lead borate, etc., boric acid being in most instances preferred. So-called "solvent oxides" such as antimony oxide, zinc oxide, and the phosphates such as ammonium phosphate are also heat resisting inorganic binder compounds, which may be used. These inorganic binders may be added separately or in the form of a compound or mixture with any of the other components and should be ground to the same fine dimension. Preferably, they should have a melting or flowing point lower than the carbonization temperature of the organic materials used. They may be used in the compound with or without the other refractory inorganic materials.

To 400 cc. of a properly thinned out compound, such as one of the types described, I add 200 grams of one of the finely divided inorganic insulating materials hereinbefore mentioned and grind these together until the solid matter has been reduced to a very fine dimension. If it is desired to add an inorganic binder, flame or heat resistant compound such as boric acid, this is preferably put in and ground with the mixture. It may be added in amounts from 2% of the amount of the insulating material up to 75%. The amount of insulating material, such as the oxide, may be determined by its specific gravity, bulking and wetting qualities and by the degree of refractoriness desired. For instance, if finely divided aluminum were used, only a small proportionate weight compared with heavy oxide would be necessary.

The size of the solid inorganic materials should be not greater than will allow them to pass through a 200 mesh screen and much better results are obtained if they are small enough to pass through a 300, 350 or 400 mesh screen.

It will be recognized, of course, that the figures given and the composition of the insulating compound may be varied within wide limits according to the use to which the compound is to be put and the amount of heat to be encountered. That is to say, in the formula given above, twice the amount of oxide may be used or only 1/16 as much and the boric acid might be 2% of the amount of oxide or 100%. The organic binder or carrier should be of proper consistency in relation to the specific gravity of the solid materials used so that these materials do not deposit too rapidly. A typical coating mixture might comprise 400 cc. of a compound consisting of two parts of rubber dissolved in two parts of an oil-resinous compounds, 200 grams finely divided iron oxide and 50 grams of boric acid, ground together. Such a mixture would also be suitable as an impregnating compound.

In the coating of the wire, a continuous process is used, the wire passing through cups containing the insulating compound and being baked in ovens located between the cups. If an inorganic binding or heat proof material is used, the coating is preferably baked to the melting point of that material, provided that can be done without carbonizing the varnish. For instance, where boric acid is used the coating may be baked to 186° C.

Rubber insulated wire has not heretofore been adaptable for magnet wire uses due to the fact that a thin insulation, which would allow the necessary high space factor, was not obtainable. Rubber insulated wire generally has been used more for fixture wire, lamp cord wire, house wiring, electric circuit wire, etc. The rubber varnish of this invention however, will permit the use of rubber insulated wire having a space factor as good as and in some cases better than enamel or varnish insulation. It may be stated that for efficient use, the wire should have an insulation of or about the thickness prescribed by the American Institute of Electrical Engineers Standards Committee for enameled magnet wire. The thickness of the various sizes are shown as follows:

| Bare wire diameter, inches | A. W. G. | Minimum addition, inches | Maximum addition, inches |
| --- | --- | --- | --- |
| 0.1285 to 0.0571, incl | (8 to 15) | 0.0015 | 0.0025 |
| 0.0508 to 0.0358, incl | (16 to 19) | .0012 | .0020 |
| 0.0320 to 0.0253, incl | (20 to 22) | .0010 | .0018 |
| 0.0226 to 0.0179, incl | (23 to 25) | .0009 | .0015 |
| 0.0159 to 0.0100, incl | (26 to 30) | .0007 | .0012 |
| 0.0089 to 0.0080, incl | (31 to 32) | .0006 | .0010 |
| 0.0071 to 0.0063, incl | (33 to 34) | .0005 | .0008 |
| 0.0056 to 0.0050, incl | (35 to 36) | .0004 | .0007 |
| 0.0045 to 0.0040, incl | (37 to 38) | .0003 | .0006 |
| 0.0035 to 0.0031, incl | (39 to 40) | .0002 | .0005 |
| 0.0028 to 0.0020, incl | (41 to 44) | .0002 | .0004 |

It is not intended that these measurements should be absolute, for instance, due to the very high dielectric strength of my insulation I have been able to produce coatings of satisfactory voltage breakdown with one third of the amount of insulation specified in the table. I have also been able to insulate wire with a thickness two, three and four times greater than that specified and have been able to use such wire with an increased insulation thickness to replace textile covered wires, even on automatic machinery windings where the wire is subject to abuse.

The rubber insulation affords a resiliency not present in ordinary varnish type insulations and a high degree of flexibility and adherence under tension is obtained.

The compound may be used as an impregnating material for the uses set out in the patent of Samuel Ruben, Patent No. 2,022,827 dated December 3rd, 1935, that is to say, sheet or fabric materials, laminating material, etc., may be impregnated as may also textile covered wire.

The proportion of finely divided inorganic insulating material, such as oxide, to rubber oil resin varnish should preferably be not less than one half pound to one gallon; in most cases it is desirable that it should be one, two, three or even four pounds to the gallon, depending upon the weight and density of the inorganic material and the amount of refractoriness desired.

If desirable and necessary a vulcanizing compound may be added or if fast drying is required, a liquid dryer, or a resin such as rosin, ester gums, kauri, phenol resins, etc., may be incorporated.

In order to illustrate the invention, reference is made to the accompanying drawing in which:

Fig. 1, shows a wire (1) having an insulating coating, consisting of a mixture (3) of a rubber-oil-resin binder, finely divided oxide and a boron compound.

Figure 2:
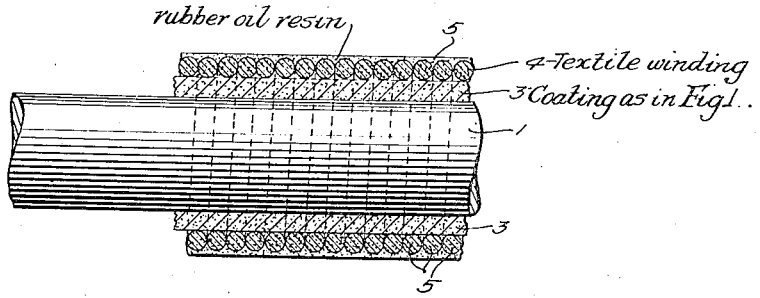
Fig. 2 shows a modification including a textile winding.

Fig. 2, shows a copper wire (1) having an insulating coating (3) similar to (3) in Fig. 1, and having a textile winding (4) impregnated with a rubber-oil-resin compound (5).

Figure 3:
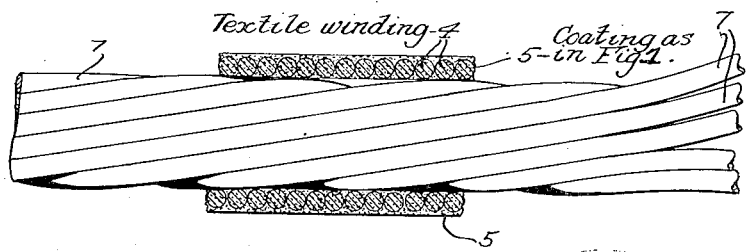
Fig. 3 shows a modification utilizing a stranded wire.

Fig. 3, shows a stranded wire (7) having a textile winding (4) impregnated with a mixture (5) consisting of finely divided oxide, a rubber-oil-resin binder and a boron compound.

I claim:

1. A wire having an insulating coating comprising a mixture of a finely divided inorganic insulating material, a rubber-oil-resin binder and a boron compound.

2. A wire having an insulating coating containing a finely divided oxide, a rubber-oil-resin binder and an inorganic binder effective at elevated temperatures.

3. A wire having an insulating coating containing a finely divided oxide, a rubber-oil-resin varnish and a boron compound.

4. A wire having an insulating coating containing finely divided chromium oxide held upon the wire by a dielectric rubber-oil-resin compound and an inorganic binder effective at high temperatures.

5. A wire having an insulating coating containing finely divided iron oxide held upon the wire by a dielectric rubber-oil-resin compound and an inorganic binder effective at high temperatures.

6. A wire having an insulating coating containing a finely divided oxide, a rubber-oil-resin varnish, a vulcanizing agent and an inorganic binding compound effective at high temperatures.

7. A wire having an insulating coating containing a finely divided oxide, a rubber-oil-resin varnish, a vulcanizing agent and a boron compound.

8. A stranded conductor having a textile winding impregnated with a mixture containing a finely divided oxide, a rubber-oil-resin binder and a boron compound.

LEON ROBBIN.